United States Patent [19]

Eisenberg

[11] Patent Number: 5,085,136
[45] Date of Patent: Feb. 4, 1992

[54] MECHANICAL DEVICE FOR LOCKING AND UNLOCKING THE BREAD HOLDER OF A TOASTER

[75] Inventor: Roger Eisenberg, Marly, France
[73] Assignee: SEB S.A., Selongey, France
[21] Appl. No.: 470,368
[22] Filed: Jan. 25, 1990

[30] Foreign Application Priority Data

Feb. 1, 1989 [FR] France ................... 89 01276

[51] Int. Cl.⁵ ............................................. A47J 37/08
[52] U.S. Cl. ..................................... 99/391; 99/329 R
[58] Field of Search ................... 99/385, 391, 327, 393, 99/328, 329 R; 219/386, 412, 492

[56] References Cited

U.S. PATENT DOCUMENTS

| | | | |
|---|---|---|---|
| 2,262,280 | 11/1941 | Gomersall | 99/391 X |
| 2,288,748 | 7/1942 | Scharf . | |
| 2,512,503 | 6/1950 | Robinson et al. | 99/391 |
| 2,545,662 | 3/1951 | Huck et al. | 99/391 X |
| 2,720,156 | 10/1955 | Theisen | 99/391 X |
| 2,870,701 | 1/1959 | DeMott | 99/391 |
| 2,951,436 | 9/1960 | Hild et al. | 99/391 |
| 2,954,451 | 9/1960 | Freeman . | |
| 3,342,121 | 9/1967 | Parelka, Jr. et al. | 99/391 X |
| 3,529,533 | 9/1970 | DeRemer | 99/391 X |
| 3,684,860 | 8/1972 | Snyder | 99/393 X |
| 3,869,970 | 3/1975 | Eagle | 99/393 X |
| 4,402,258 | 9/1983 | Guarnerio . | |

Primary Examiner—Harvey C. Hornsby
Assistant Examiner—Scott J. Haugland
Attorney, Agent, or Firm—Young & Thompson

[57] ABSTRACT

A toaster having a bread holder (17) mounted to slide vertically in the toaster, has a mechanical device (25) for locking and unlocking the bread holder (17). This device (25) enables the holder (17) to be locked in a low position, and a return spring is provided for raising the holder (17). The mechanical device (25) comprises an upper connecting rod (56) articulated with a lower connecting rod (57) by a common articulation (59), an end of the upper connecting rod (56) opposite the common articulation (59) being articulated at a fixed point (58) and an end of the lower connecting rod (57) opposite the common articulation (59) being articulated with the holder (17). An intermediate lever (42) is articulated with the upper connecting rod (56), and a spring (63) acts on the intermediate lever (42) for retaining the holder (17) in the low position. An end of the intermediate lever (42) comprises a tip (24) which is engageable with a retaining catch (45) when the holder (17) is moved into the low position. The tip (24) and catch (45) are applied against each other under a substantially horizontal force (F₇) resulting from the upwardly exerted force (F₅) of the return spring of the holder (17).

1 Claim, 6 Drawing Sheets

FIG_1

FIG_3

FIG.4

FIG_5

MECHANICAL DEVICE FOR LOCKING AND UNLOCKING THE BREAD HOLDER OF A TOASTER

FIELD OF THE INVENTION

The present invention relates to a mechanical device for locking and unlocking the bread holder mounted so as to slide vertically inside a toaster, said device enabling the holder to be locked in a low position and the said holder being raised by a return spring.

BACKGROUND OF THE INVENTION

Conventionally, the unlocking of the holder and its automatic rise are actuated automatically, when the preset operating duration of a time delay has elapsed.

OBJECT OF THE INVENTION

The object of the present invention is to enhance the known devices by improving the accuracy and reliability thereof.

SUMMARY OF THE INVENTION

According to the invention, this improved device comprises an upper connecting rod articulated with a lower connecting rod, the end of the upper connecting rod opposite the common articulation being articulated at a fixed point and the end of the lower connecting rod opposite the common articulation being articulated with the holder, wherein an intermediate lever extending at right angles to the upper connecting rod is articulated with the said upper connecting rod against the action of a spring, the end of said lever comprising a tip capable of attaching itself to a fixed retaining catch when the holder is moved into the low position, said locking being maintained by the upwardly exerted force of the return spring of the holder and means being provided so as to apply a traction force to the end of the intermediate lever so as to pivot the said intermediate lever and unlock the tip from the catch in order to allow the holder to rise again.

Hence, it is sufficient to apply a slight vertical traction force to the end of the abovementioned intermediate lever in order to cause the holder to rise.

In an advantageous version of the invention, in the locking position, the straight line joining the fixed articulation of the upper connecting rod and the articulation of the lower connecting rod with the holder is located slightly this side of the common articulation of the two connecting rods, the restoring force of the spring of the holder acting in a vertical plane extending beyond the abovementioned common articulation.

This arrangement makes it possible to reduce the traction force to be exerted on the intermediate lever in order to unlock it.

In a preferred version of the invention, the means to apply a vertical traction force on the end of the lever comprise a blade connected to a bimetallic strip capable of incurvating under the influence of heat, said blade and said lever end comprising additional locking means and said bimetallic strip being capable of effecting on the blade sufficient traction force to make the lever pivot and to unlock it.

BRIEF DESCRIPTION OF THE DRAWINGS

Other features and advantages of the invention will emerge in the description which follows.

In the attached drawings, given by way of non-limiting example.

DETAILED DESCRIPTION OF THE INVENTION

Figure 1:
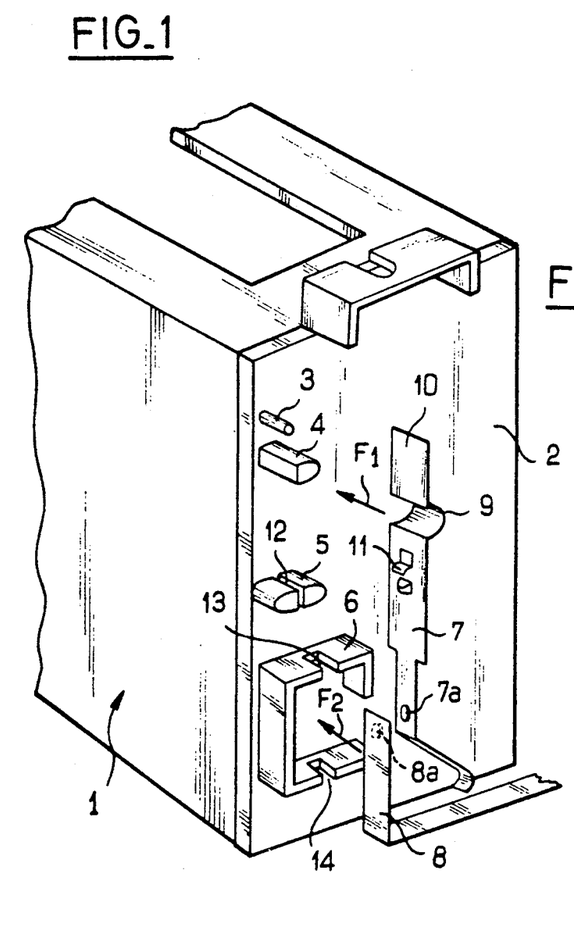
FIG. 1 shows a partial perspective view of a toaster provided with a lateral plate intended to support electrical connections.

In FIG. 1, the toaster 1 has on one of its end lateral faces a plate 2 moulded in plastic material, the dimensions of which correspond substantially those of the said lateral face.

Said plate 2 of electrically insulating plastic material serves both as a mechanical and electrical support.

In the example illustrated, the plate 1 has on its external face a certain number of tongues or protuberances 3, 4, 5, 6 moulded at the same time as the plate intended to receive and position directly (without insulating material or an additional securing piece) metallic contact and connection studs such as 7, 8. Said studs 7, 8 serve to control operation of the toaster by means of a time delay device not shown in FIG. 1.

The tongues or protuberances 3, 4, 5, 6 provided on the plate 2 are shaped so as to be able to be removed from their mould by extraction in a direction perpendicular to the plate 2.

Likewise, said tongues or protuberances 3, 4, 5, 6 are shaped so as to receive and position the studs 7, 8 by a simple movement of said studs perpendicular to the plate 2 (see arrow $F_1$ and $F_2$). This movement may be executed very simply by a robot or a manipulator arm.

In this manner, the stud 7 exhibits a part folded in a U 9 which is applied against an additional surface for the protuberance 4, while the end 10 of said stud 7 bears against the tongue 3 located above the protuberance 4.

Under the part in the shape of a U 9 the stud 7 has two resilient tongues 11 which snap onto the left part of the protuberance 5 which is separated from the right part of the said protuberance 5 by a slot 12 which receives the stud 7 proper. Said stud 7 engages also in the upper slot 13 provided in the protuberance 6 in the form of a rectangular trough. The lower slot 14 of said protuberance 6 receives the stud 8.

The studs 7 and 8 have opposite one another contacts 7a, 8a capable of establishing an electrical contact between the said two studs when they are drawn towards one another.

The tongues and protuberances 3, 4, 5, 6 provide extremely precise positioning of the studs 7, 8 in relation to each other which ensures excellent reliability, while allowing easy moulding and dispensing with additional parts such as screws or the like.

Of course, the plate 2 may comprise other easily moulded protuberances or recesses able to receive other elements or accessories, the installing of which may also be effected by robots.

Figure 2:
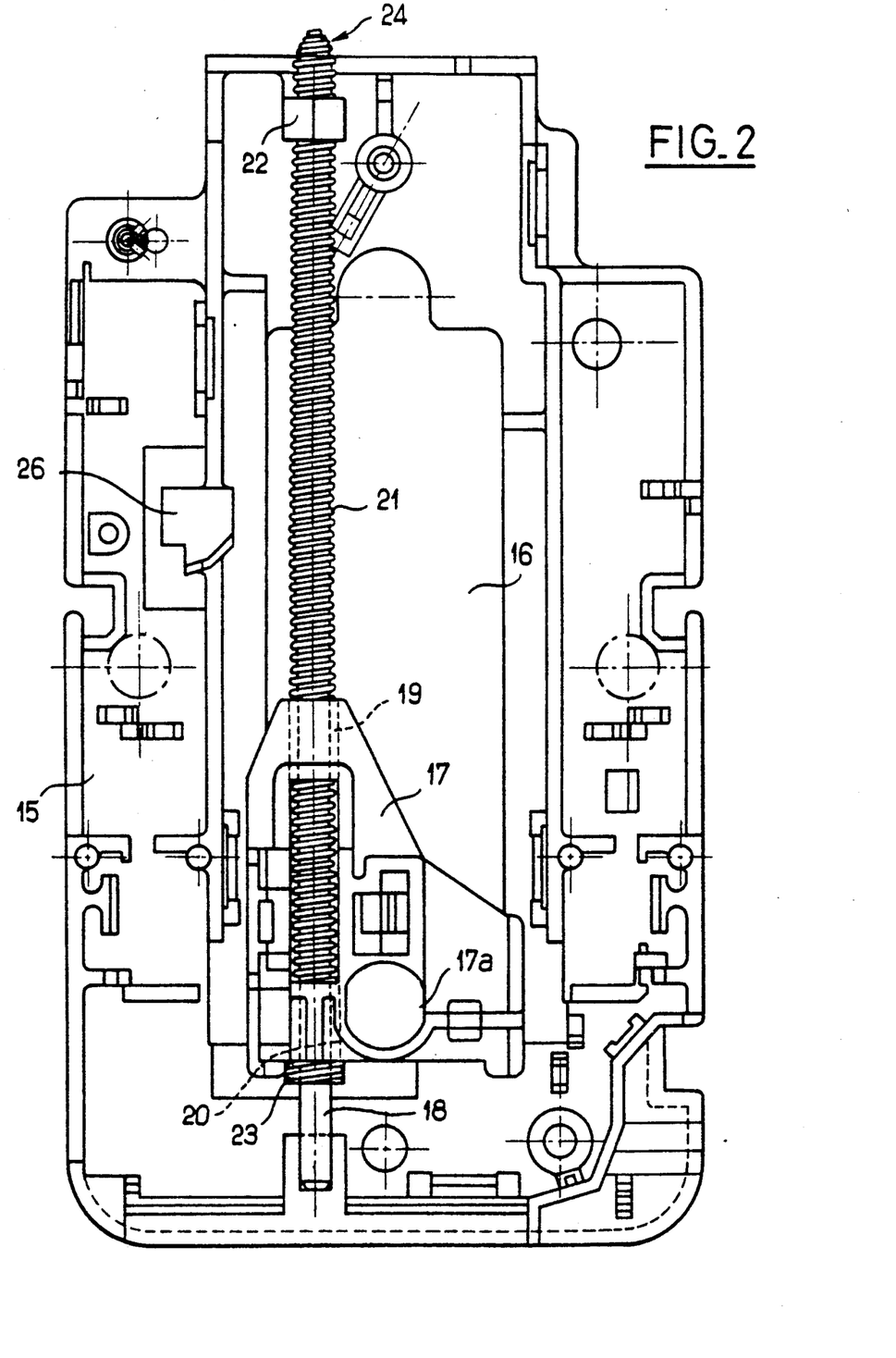
FIG. 2 is a plan view of a plate of a toaster bearing the sliding holder intended to raise the slices of bread.

In FIG. 2, the plate 15 which is provided on one of the end faces of the toaster has a central recess 16.

In said recess 16 there is mounted a holder 17 which slides vertically from bottom to top and vice versa. Said holder 17 may be operated by a gripping member (not shown) secured in the orifice 17a.

In FIG. 2, the holder 17 is in the low position. Said holder 17 supports a horizontal arm (not shown) bearing the slices of bread to be toasted.

The holder 17 is guided in its vertical sliding movement by a vertical rod 18 which engages in cylindrical openings 19, 20 provided at the top and bottom of the holder 17. The diameter of said openings 19, 20 is substantially larger than that of the rod 18, actually corresponding to the diameter of the helical spring 21 mounted on the rod 18. The said spring 21 extends virtually over the whole length of the plate 15. Its upper end 24a is conical and is inserted in the upper part of the rod 18, while its lower end has an enlarged diameter 23 which abuts against the periphery of the lower opening 20 of the holder 17.

In the position shown in FIG. 2, the holder 17 is in the low position and the spring 21 is tensioned. The holder 17 is locked in this position by a member (not shown in FIG. 2). When said member is unlocked, the holder 17 is returned upwards by the spring 21, which, at the same time, raises the slices of bread.

During movement of the holder 17, in addition to its restoring function, the spring 21 acts also as a sliding surface. Since the forces are exerted exactly within the axis of the rod 18, the holder 17 is not subjected to any torque likely to cause friction and wear of the surfaces of the holder.

Moreover, since the spring 21 is co-axial with the rod 18, the structure of the assembly is very compact.

Figure 3:
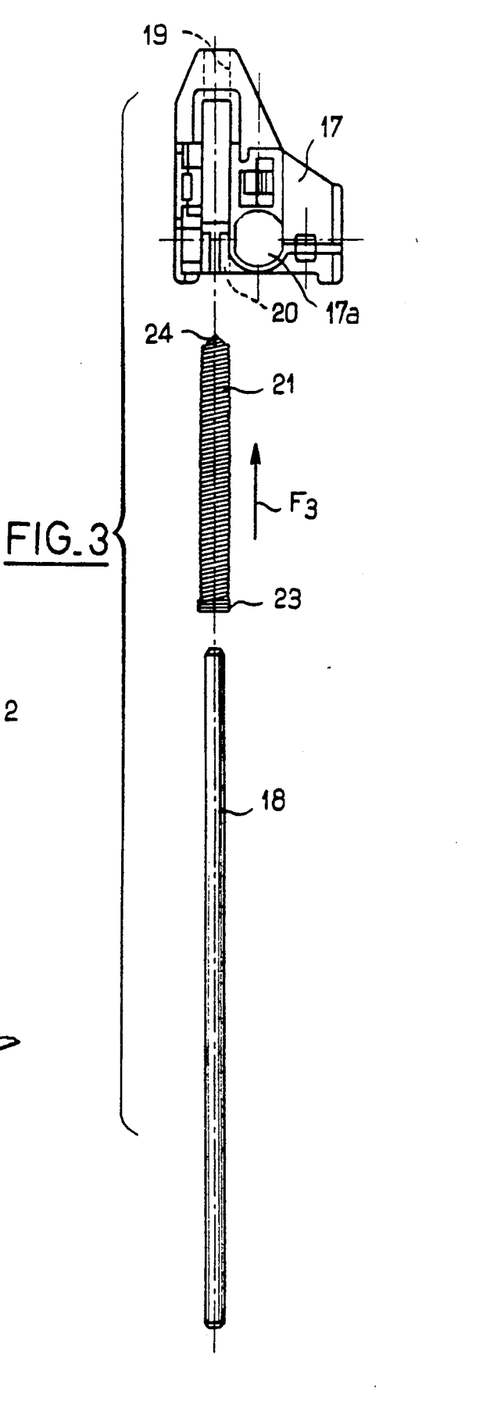
FIG. 3 is an exploded plan view showing the holder, its return spring and its guiding rod.

FIG. 3 illustrates assembly of the rod 18, spring 21 and holder 17 arrangement.

First, the spring 21 is mounted in the openings 20 and 19 of the holder 17 in the direction of the arrow $F_3$. This installation is facilitated by the fact that the upper end 24a of the spring 21 is conical.

The enlarged rear part 23 of the spring 21 makes it possible to secure said spring under the opening 20 of the holder 17.

It is then sufficient to engage the rod 18 in the spring 21 in place in the holder.

Figure 4:
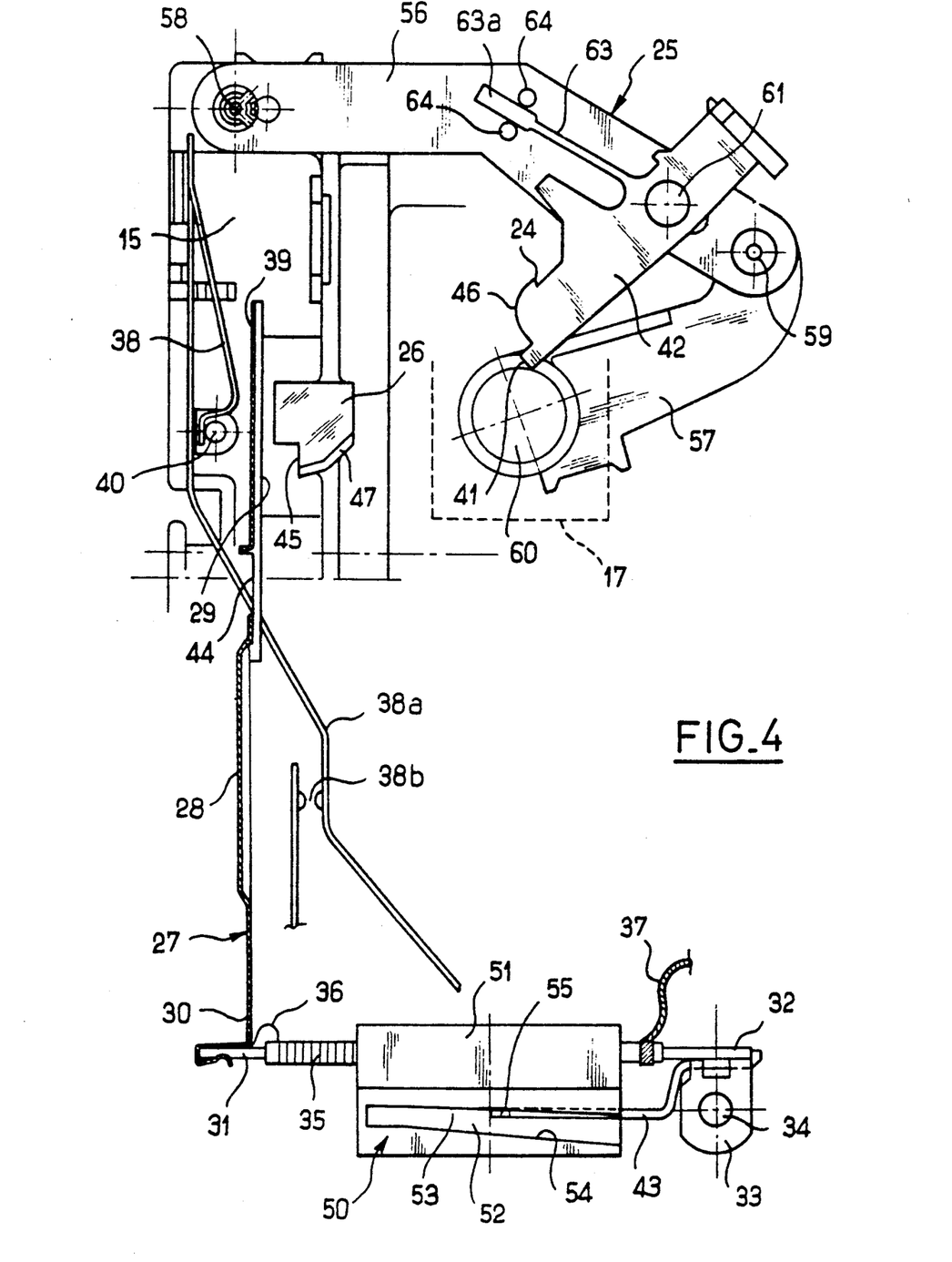
FIG. 4 is a plan view of the mechanical and electrical control device of the holder, the said holder being in its high position.
Figure 5:
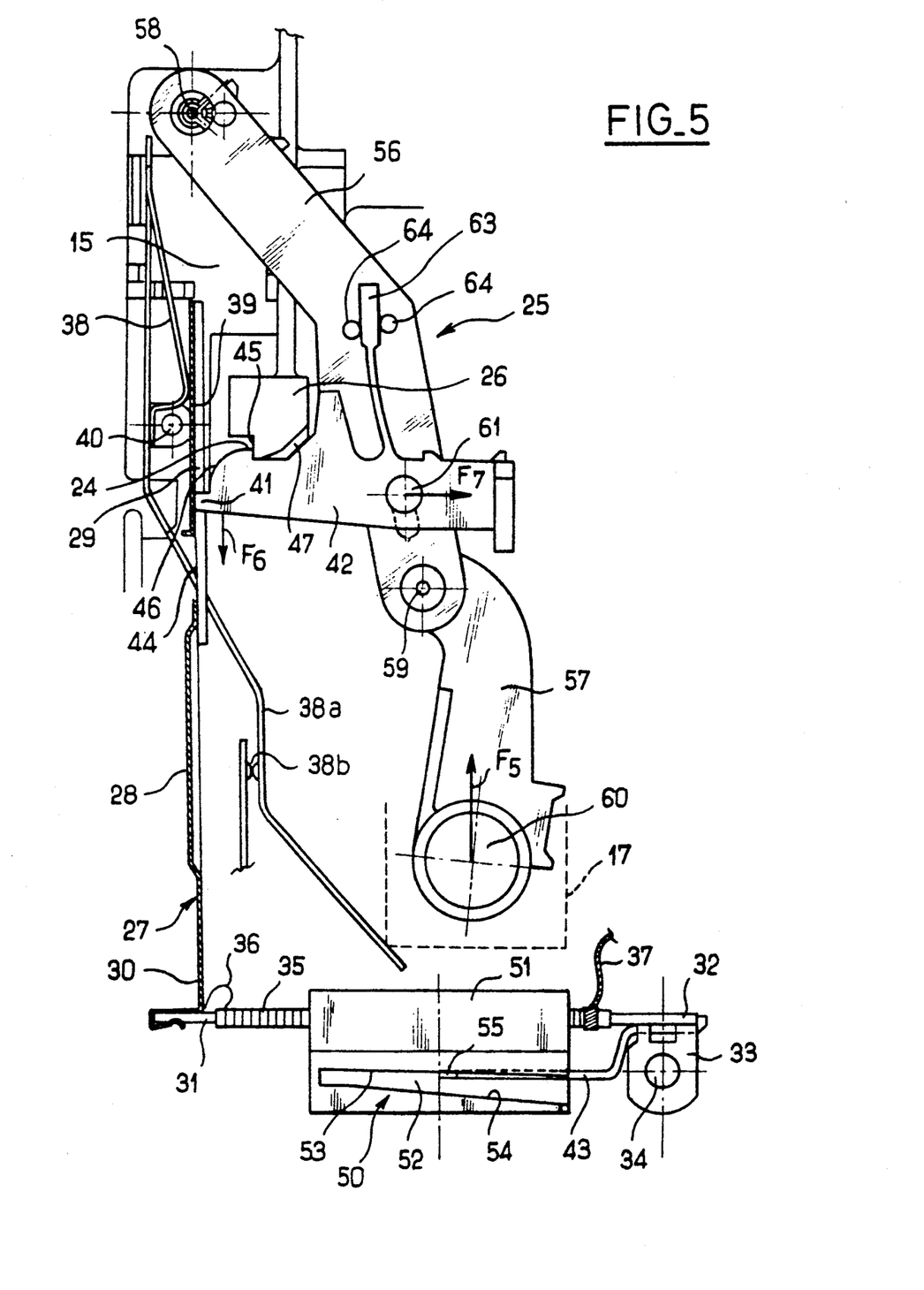
FIG. 5 is a view similar to that of FIG. 4, the holder being in a low position.

FIGS. 4 and 5 show the control system for moving the holder 17 (shown in dotted lines). First, the known principles are to be borne in mind. In the rest position, shown in FIG. 4, the holder 17 is in the high position. When a user wishes to toast slices of bread, he puts the holder 17 in the low position. In the present embodiment, and as indicated in FIG. 5, the spring 21 (see FIG. 2) attached to the holder 17 is tensioned and said holder is locked by means of the tip 24 supported by a mechanism 25 integral with the holder 17, in engagement with a shut-off device 26 integral with the plate 15 (see also FIG. 2). The mechanism 25 will be described in detail below.

There now follows a description of the device which makes it possible to actuate unlocking of the holder 17, when the slices of bread are sufficiently toasted.

Said device comprises a metallic blade 27 extending vertically and stiffened over virtually its whole length by means of an embossed rib 28 (see, in particular, FIGS. 7 and 8) extended by an upper part of U-shaped section 39. The lower end 30 of the blade 27 is narrowed so as to localize bending of said blade at this level.

Figures 6, 7:
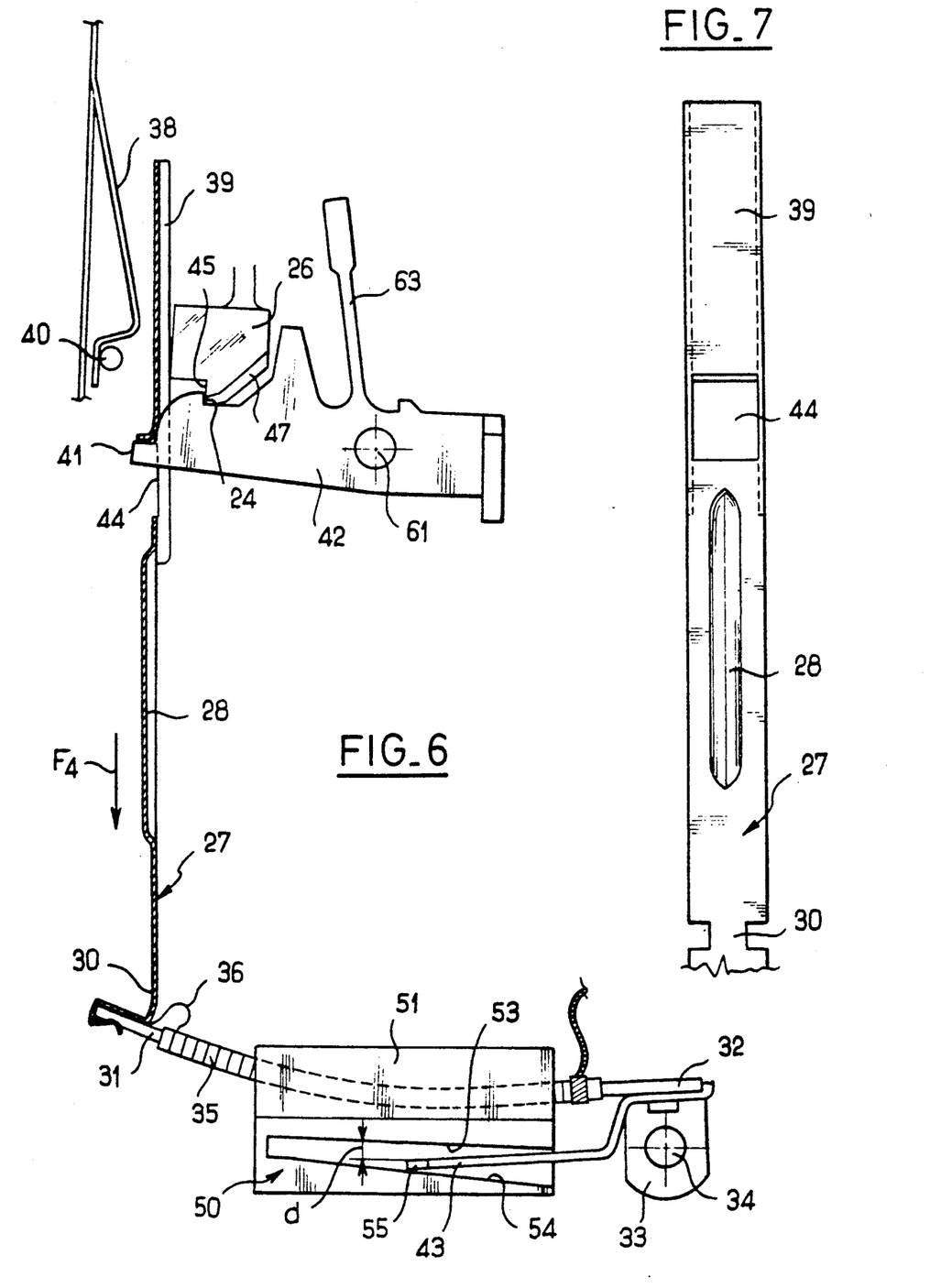
FIG. 6 is a view similar to the view of FIG. 5 showing the action of the bimetallic strip on the control blade for triggering the mechanism causing the holder to rise.
FIG. 7 is a plan view of the control blade.
Figure 8:
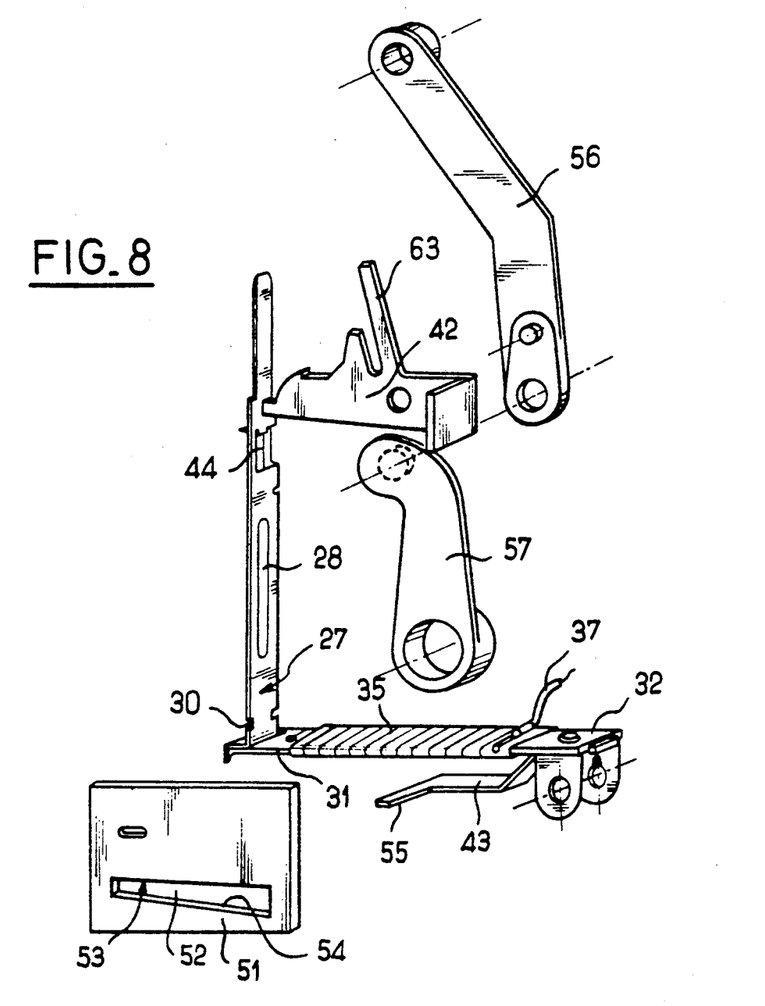
FIG. 8 is an exploded perspective view of the electrical and mechanical control device of the holder.

The lower end of the blade 27 is made in one piece with a bimetallic strip 31 extending substantially perpendicular to the blade 27.

The end 32 of the bimetallic strip 31 has a lug 33 articulated about a pin 34 integral with the plate 15.

There is wound around the bimetallic strip 31 an electrical heating resistor 35 connected electrically between a bare conducting wire 36 in contact with the blade 27 and an insulated conducting wire 37.

The connection and disconnection of the heating resistor 35 is effected by co-operation between a resilient thin connection strip 38 and the upper part 39 of the blade 27.

Movement of the thin strip 38 towards the above-mentioned part 39 is limited by a fixed stop 40.

In the position shown in FIG. 4, the upper part 39 of the blade 27 is at a distance from the thin strip 38 and the holder 17 is in the high position. The heating resistor 35 is not powered.

In the position in FIG. 5, the holder 17 is in the low position and a spigot 41 provided on the end of the arm 42 of the mechanism 25 is supported on the blade 27 and keeps the end 39 of said blade in contact with the thin strip 38.

Furthermore, the holder 17 is supported on a link 38a connected to the thin strip 38, thus closing off an electrical switch 38b providing the electrical power of the link 38a.

As a result, the heating resistor 35 is supplied with electrical current.

Said heating resistor 35 then heats the bimetallic strip 31, which incurvates and causes the blade 27 to rise (see FIG. 6), it being understood that a member 43 which will be described below limits the pivoting of the bimetallic strip 31 about the pin 34.

As the blade 27 rises, the part 39 thereof slides over the thin resilient strip 38 and the electrical supply of the resistor 35 is maintained until the spigot 41 of the arm 42 penetrates a window 44 provided in the blade 27 (see also FIG. 7).

As results of this engagement, the blade 27 bends resiliently towards the arm 42 and the part 39 of the blade moves away from the thin strip 38 and bears against the stop 26. The heating resistor 35 is then disconnected.

Since the electrical supply of the resistor 35 is cut off, the bimetallic strip 31 tends to resume its rest position. During this movement, the blade 27 is drawn in the direction of the arrow $F_4$. Since the spigot 41 of the arm 42 is retained in the window 44 of the blade, said spigot 41 is drawn downwards, which causes the arm 42 to rock, the tip 24 to be released from the retaining catch 45 of the stop 26, the spigot 41 to escape from the window 44 and the holder 17 to rise under the action of the return spring 21.

In order to restore the toaster to its operating position, it is sufficient to lower the holder 17 manually into the position indicated in FIG. 5, in which the tip 24 of the arm 42 becomes attached to the retaining catch 45 of the stop 26. This method of locking is facilitated by the fact that the end of the arm 42 has between the spigot 41 and the tip 24 a curved surface 46 which can slide over an inclined ramp 47 provided on the stop 26 upstream of the retaining catch 47.

When the toaster is returned to the operating position shortly after the automatic rise of the holder 17, the bimetallic strip 31 has not returned to the ambient temperature and, as a result, has not returned fully to its rest position.

In this case, the distance between the window 44 and the spigot 41 of the arm 42 is smaller than in the case when the bimetallic strip 31 has resumed its initial form and position entirely.

Plus, after connection of the heating resistor of the bimetallic strip 31, the said strip will very quickly resume the position shown in FIG. 6, in which the spigot 41 engages in the window 44 and after which the resistor 35 is disconnected and the holder 17 rises. In this case, the slices of bread carried by the holder 17 will have been inadequately exposed to the rays of the resistors in the toaster and, consequently, will not be sufficiently toasted.

To overcome this drawback, the invention provides a compensation system 50 which will be described below.

The term "compensation" defines the time which the appliance must deduct automatically from the setting of the toaster, after a first operation, in order to obtain the same toasting of the bread when put into operation a second time and then the following nth times. When starting from cold, the toasting time is, for example, for average toasting (number 3) 160 seconds. After 20 seconds stoppage (removal of the toast and reloading), the toaster is operated again. The operating time must then be 120 seconds in order to obtain the same toasting of the bread. The compensation is, in this case, 25%.

This compensation is obtained constructionally. With cooling of the bimetallic strip, and hence its bending, is a reflection of the cooling of the carcass of the toaster (heating bars, reflectors, grill, body and others).

For an ideal heating system, the temperature rise curves and the cooling curves are repetitive.

Figure 9:
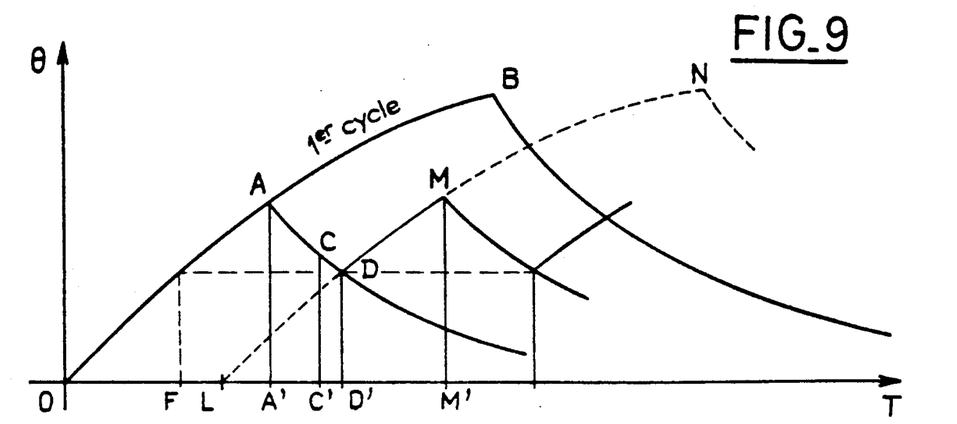
FIG. 9 is an operational diagram.

These curves are illustrated in FIG. 9 which shows the temperature θ on the ordinate and the time T on the abscissa.

In this figure, the letters used denote respectively:

| OAB | First temperature rise curve (setting number : 6) |
|---|---|
| A | Disconnection of the heater 31 (and heating bars) for the setting 1 |
| OA' | Time of first heating, for the setting 1 |
| AC | Cooling of the heater |
| C | Rise of the holder (end of cycle) |
| D | Resetting |
| C'D' | Time required for unloading/reloading |
| OF | Represents heat compensation |
| LMN | Temperature rise curve, the section DM of which is used during the nth operation. |

In reality, in addition to simple cooling, there is a phenomenon of hysteresis of the bimetal inherent in the material and the thickness of its components, the molecular bond between them, and for other reasons. The higher the temperature of the bimetallic strip, the greater the hysteresis. The hysteresis is added to the compensation time due to the resetting temperature.

The system 50 comprises a member 51 located opposite the bimetallic strip 31 and mounted so as to slide in horizontal slides (not shown). The member 51 comprises a slot 52 extending substantially in the direction of the bimetallic strip 31 and below said strip. Said slot 52 delimits an upper ramp 53 and a lower ramp 54.

In said slot 52 engages an arm 43 made in one piece with the end 32 of the bimetallic strip adjacent to the articulated lug 33. The end of said arm 43 bears a heel 55 which is supported either on the upper ramp 53 when the bimetallic strip 32 is at rest (see FIGS. 4 and 5), or on the lower ramp 54 when the bimetallic strip is incurvated (see FIG. 6).

Thus at the start of heating of the resistor 35, the incurvation of the bimetallic strip 31 does not cause any upward movement of the blade 27, because, during this period, the bimetallic strip 31 incurvates by displacing the heel 55 of the arm 43 of the upper ramp 53 towards the lower ramp 54 by pivoting about the pin 34. It is only when the heel 55 is supported on the lower ramp 54 that the subsequent incurvation of the bimetallic strip 31 causes the blade 27 to move upwards.

As a result, the distance d (see FIG. 6) between the heel 55 and the upper ramp 53 determines the duration during which the incurvation of the bimetallic strip 31 does not cause any displacement of the blade 27.

The result is therefore that, when the bimetallic strip 31 is cold, that is to say not incurvated (see FIGS. 4 and 5), the duration during which the holder 17 is in the low position (and during which the slices of bread are exposed to the rays of the resistors) is equal to the duration needed to displace the heel 55 along the distance d, plus that required to displace the blade 27 until the spigot 41 engages in the window 44.

On the other hand, when, after first use, the holder 17 is returned to the low position and the bimetallic strip 31 is still hot and incurvated, such that the heel 55 is supported on the lower ramp 54, the abovementioned duration is reduced to that required to displace the blade 27.

Given the slope of the ramps 53 and 54, the abovementioned distance d varies according to the position of the heel 55 in relation to said ramps. Said distance d may be adjusted by moving the block 51 to the right or to the left, which has the effect of adjusting the time for toasting the slices of bread.

The lower ramp 54 makes it possible to adjust the inclination of the bimetallic strip 31, and hence to determine the time for maintaining the heater 35 and heating bars of the toaster under tension. The upper ramp 53 (the slope, of which is smaller than that of the ramp 54) makes it possible to alter the cycle stopping point on the cooling curve, which acts on the compensation modifying the temperature for resumption of the following cycle. It has a slope such that, for adjustment of long duration, the heel 55 may not rise as far as for a short duration.

To sum up, the ramp 54 makes it possible to adjust the heating time, while the counter ramp 53 makes it possible to modify the disconnection point on the cooling curve.

Another important feature of the invention resides in the structure of the mechanism 25 attached to the holder 17.

This is a toggle joint mechanism. Said mechanism is made up of two articulated connecting rods 56 and 57 parallel to the plate 15 (see FIGS. 4, 5 and 8).

The end of the upper connecting rod 56 is articulated at 58 with the plate. Its opposite end is connected by an articulation 59 to the lower connecting rod 57 which is itself connected by an articulation 60 to the holder 17. As already mentioned above, said holder 17 may slide vertically, its movements being guided by the rod 18 (see FIG. 2).

The intermediate lever 42 extends at right angles to the upper connecting rod 56 and it is connected to said upper connecting rod by a journal 61. Rotation of the lever 42 is limited by a spring arm 63 at right angles to the latter extending in the direction of the connecting rod 56 and the end 63a of which is guided between two projections 64 integral with the lever 56. As already described above, the end of the intermediate lever 42 has a curved surface 46 at the rear of which is provided a securing tip 24 capable of being locked on a retaining catch 45 provided on a stop 26, as indicated in FIG. 5.

In the position indicated in FIG. 5, the force $F_5$ exerted by the spring of the holder 17 tends to return the said holder upwards. Since the point of articulation 59 of the connecting rods 56 and 57 is located on this side of the line joining the extreme articulations 58 and 60, said force $F_5$ causes a horizontal resultant $F_7$ (see FIG. 5) which, returned to the level of the intermediate lever 42, tends to apply the catch 45 against the tip 24.

Unlocking of the tip 24 from the catch 45 is effected by pulling the end of the lever 42 downwards (see arrow $F_6$ in FIG. 5).

Under the influence of said force $F_6$, the lever 42 pivots slightly about the pin 61 against the restoring action exerted by the spring arm 63.

The force required to make the lever 42 pivot is of the order of 60 and 100g. As already explained above, said force is produced during cooling of the bimetallic strip 31 which generates a downward traction force of the blade 27.

After pivoting of the lever 42, the mechanism 25 assumes the position shown in FIG. 4. In order to relock the holder 17 in the low position, it is sufficient to pull the latter downwards by means of the handle provided for this purpose, which automatically brings the end of the lever 42 opposite the stop 26. By continuing the movement, the curved part 46 of the end of the lever 42 slides over the ramp 47 of the stop, which causes resilient deformation of the spring arm 63 and, at the end of the travel, the tip 24 becomes attached to the retaining catch 45.

Of course, the invention is not limited to the embodiments which have just been described and it is possible to make many modifications to these embodiments without going outside the scope of the invention. Amongst other things, the lever 42 may also be mounted so as to pivot on the connecting rod 57, or directly about the pin 59 common to the two connecting rods. Said lever may also be dispensed with and replaced by a retaining device for the pin 59, such as a magnet or an electromagnet.

I claim:

1. A toaster comprising a bread holder (17) having means (17a) for directly mounting an actuation member thereon, guide means (18, 19, 20) to provide a sliding direction for raising and lowering the bread holder (17), a return spring (21) for applying a raising force ($F_5$) to the bread holder (17), and a plate (15) disposed at one end of the toaster, said plate (15) carrying a mechanical device (25) for locking and unlocking the bread holder (17) in a low position, wherein said mechanical device (25) comprises an upper connecting rod (56) and a lower connecting rod (57) having respective first ends articulated with each other and second ends opposite said first ends, respectively, the plate (15) comprising a fixed point (58) at which said second end of the upper connecting rod (56) is articulated, said second end of the lower connecting rod (57) being articulated with the holder (17), said mechanical device (25) further comprising an intermediate lever (42) articulated with one of said upper and lower connecting rods (57), an end of said intermediate lever (42) comprising a tip (24), a retaining catch (45) being provided on the plate (15), said tip (24) being engageable with said retaining catch (45) when the holder (17) is moved into the low position, said end of the intermediate lever (42) further comprising a projection (41), wherein control means are provided to disengage the tip (24) from the catch (45), said control means comprising a single blade (27) and a bimetallic strip (31) disposed substantially perpendicular to each other, the bimetallic strip (31) having a first end (32) mounted on the plate (15) and a second end, the blade (27) having one end connected to said second end of the bimetallic strip (31) and extending substantially transverse to the intermediate lever (42) when the tip (24) is engaged with the cathc (45), the blade (27) comprising a window (44) disposed to come into registry with and receive said projection (41) when said bimetallic strip (31) is heated and pushes said blade (27) lengthwise in one direction and to apply a transverse traction force ($F_6$) to the intermediate lever (42) to disengage the tip (24) from the catch (45) when the bimetallic strip (31) cools and pulls the blade (27) lengthwise in the opposite direction.

* * * * *